United States Patent [19]

Kornylak

[11] Patent Number: 5,035,314
[45] Date of Patent: Jul. 30, 1991

[54] GRAVITY ROLLER CONVEYOR CONSTRUCTION

[75] Inventor: Andrew T. Kornylak, Hamilton, Ohio

[73] Assignee: Kornylak Corporation, Hamilton, Ohio

[21] Appl. No.: 426,112

[22] Filed: Sep. 28, 1982

[51] Int. Cl.$^5$ .............................................. B65G 13/00
[52] U.S. Cl. ............................................. 193/37; 16/46
[58] Field of Search .................. 193/35 R, 37; 16/45, 16/46; 301/5.3, 5.7, 65

[56] References Cited

U.S. PATENT DOCUMENTS

| | | |
|---|---|---|
| 934,010 | 5/1875 | Maskornick . |
| 1,576,924 | 3/1926 | Malloy .................................. 301/5.3 |
| 2,241,685 | 5/1941 | Ware .................................... 301/5.3 |
| 2,241,686 | 5/1941 | Ware .................................. 301/5.7 X |
| 2,943,889 | 7/1960 | Woldring et al. . |
| 3,103,387 | 9/1963 | Saxenberg . |
| 3,443,674 | 5/1969 | Kornylak .............................. 193/37 |
| 3,771,206 | 11/1973 | Brown . |
| 3,843,202 | 10/1974 | Lacerte . |
| 3,895,844 | 7/1975 | Merbler . |
| 3,988,045 | 10/1976 | Coutant . |
| 4,050,561 | 9/1977 | Seitz .................................. 193/37 X |
| 4,110,882 | 9/1978 | Hodge et al. . |
| 4,178,664 | 12/1979 | McLoughlin . |
| 4,203,509 | 5/1980 | Thompson et al. ................... 193/37 |
| 4,218,098 | 8/1980 | Burton . |
| 4,244,413 | 1/1981 | Takahashi et al. . |

FOREIGN PATENT DOCUMENTS 202436 7/1956 Australia .
203839 10/1956 Australia .

OTHER PUBLICATIONS

Ball and Roller Bearings, Their Theory Design Application, by Eschman, pp. 164, 165.

Primary Examiner—Andres Kashnikow
Attorney, Agent, or Firm—Fay, Sharp, Beall, Fagan, Minnich & McKee

[57] ABSTRACT

In a gravity rollerway conveyor having a plurality of resilient tired rollers with low friction bearings, the resilient tires are selected for various properties desired for the overall conveyor and are permanently preassembled on metallic cylindrical tubes for stockpiling, so that thereafter they may be selected for a particular job and mechanically force fit or cemented onto the outer race of a standard roller subassembly that has the bearing. In this manner, the secure assembly of the tire can be accomplished without contaminating or deteriorating the bearing or other parts of the roller subassembly.

9 Claims, 1 Drawing Sheet

GRAVITY ROLLER CONVEYOR CONSTRUCTION

BACKGROUND OF THE INVENTION:

The present invention relates to resilient tired rollers, particularly for gravity rollerway conveyors, and more particularly the construction of the roller in this environment.

In U.S. Pat. No. 3,621,960, issued Nov. 23, 1971, entitled "Conveyor With Rollers Having Tires of High-Hysteresis Material", by the present inventor, a gravity rollerway conveyor is disclosed, and the complete disclosure thereof is incorporated herein by reference.

SUMMARY OF THE INVENTION:

It has been found that several problems occur relating to the manufacturing procedure and to the wide variety of roller designs needed to satisfy the market.

It is important that the bond between the tire and the roller will not fail in service. The correction of such a failure usually involves expense far in excess of the total equipment sale price and great inconvenience to the customer since the usually perishable inventory stored in the rack must be removed and extensive disassembly is necessary before wheels can be removed and replaced. The manufacturing procedure for assuring the bond quality involves solvent cleaning of the wheel to remove surface oil and other contaminants, followed by sand blasting or wire brushing, coating the surface with a primer, then a coat of adhesive and finally molding on the tire. The tire is then heat cured. The steps of solvent cleaning removes oil from the wheel bearing and may damage the bearing seal if one is used. Sand blasting can destroy the bearing and even if proper shielding is used, the fine grit which permeates the plant environment is a source of bearing damage. The heat needed to dry the coatings and to cure the tire deteriorates rubber or plastic bearing seals and affects the bearing lubricant.

The final product has a diversity of applications. One such diversity is in temperature of the environment, including −40° F. for a freezer, +28° F. for a meat cooler, and a range of +50° F. to +100° F. for an industrial warehouse. Since no economic tire composition has yet been found to meet all these conditions, it has been necessary to produce a minimum of three compositions.

Another diversity relates to load capacity to support the variety of loads ranging from appliances weighing 100 pounds to air cargo loads weighing 17,000 pounds. While this diversity is primarily accommodated by utilizing a larger number of wheels under the load, the risk of a load concentration on a single wheel caused by load surface irregularities requires that the individual wheels be matched to the load. Heretofore this has been accomplished by increasing the size of the wheel in order to provide a wider rim for a wider tire. Since the inadequacy is not in the bearing capacity, this is an expensive solution.

Yet another diversity involves the proper matching of hysteresis value to the application. Presently wheels are manufactured with either low hysteresis or high hysteresis tires. There is also a choice of hysteresis tires for controlling load speed on a sloping conveyor or non-hysteresis tires when loads are to be pushed along a level conveyor. Such a choice of tire would greatly differ from the choice of tire for another environment, such as in a manufacturing plant wherein the environment temperature is quite high and hot articles must be moved along such a conveyor.

It is evident that this diversification calls for a larger and more expensive inventory. The cost is further increased by taxes levied on inventory.

Besides temperature and hysteresis need, other characteristics of the conveyor environment may be controlling with respect to the choice of tire, for example, the resilient properties or the hysteresis properties of the tire may primarily be chosen in accordance with the weight of the articles being conveyed, which can differ greatly between boxes of empty bottles on one hand and loaded pallets of machinery on the other hand. Choice of tire hardness also varies to accommodate non-uniformity of load surface.

Further, when shipping wheels overseas, it is necessary to pay duty on the product. As will be explained later, the new invention reduces this duty to approximately one-half. As a further complication, some countries will not permit import of the product, claiming that it is essentially a bearing or wheel which can be produced locally, overlooking the technology of the tire manufacture. This invention permits import of only the high technology tire for assembly with domestically produced wheels.

Thus, the invention improves quality assurance, reduces manufacturing costs and taxes, reduces inventory requirements, offers simplified diversity, reduces overseas sales costs and overcomes foreign trade restrictions. It also allows greater freedom in choice of substrate material for the inner rim of the tire. In addition, replacement of damaged wheels is accomplished by removing the tire subassembly and pressing a new tire on the old wheel, a saving of approximately half.

The result of these requirements is that a large stock of rollers must be manufactured and stored in complete form including an axle, an anti-friction bearing having an inner race, outer race, and antifriction roller elements, and tire permanently assembled as a unit. As in the above-mentioned patent, some of these elements may be in one piece with each other, that is, the shaft and inner race in one piece, whereas other elements may, in fact, be split into multiple pieces, such as in the patent wherein the outer race is, in fact, split into two portions secured by means of rivets. In any event, the basic elements exist. Therefore, the expected differing requirements for the resilient tire necessitate the stockpiling of a great quantity of entire roller assemblies, which creates an expensive inventory.

There are advantages to permanently bonding the resilient tire to a rigid substrate, which would include the prevention of heat build-up due to movement between the tire inner surface and the substrate outer surface, the prevention of the tire walking around the surface of the substrate, the axial movement of the tire off of the substrate, etc., when the tire is in use and further the stress analysis radially through the tire is different between a tire that is bonded and one that is unbonded. Therefore, there are many practical reasons why it is desired and sometimes necessary to bond the resilient tire to a rigid substrate in this environment, and the present invention deals with such bonded tires.

In the past, almost $100,000 in expenses has been incurred by the assignee of the present invention as a result of faulty adhesion of tires on the outer periphery of rollers having roller bearings. This is a significant amount for the assignee, a small business with about 100 employees, and the manufacture of rollers being a small part of such business.

In the present invention, the elastomeric tire is permanently bonded to a metal sleeve, cylindrical tube, or the like, which is thereafter mechanically interference or force fit onto a wheel subassembly or wheel that comprises at least an outer race, anti-friction roller elements, and an inner race, so that thereby assembled rollers may be, in turn, assembled in flights of rollers to provide a rollerway conveyor or guide.

In manufacturing and marketing a roller and rollerway conveyor such as disclosed in the above-mentioned U.S. patent, a number of problems have been encountered, recognized and analyzed, as follows:

(1) The bonding between the resilient tire and the rigid substrate has not always been satisfactory due to contamination, for example, lubricating oil or grease required in the antifriction bearing or necessary manufacturing oil required in the assembly or manufacture of the roller subassembly being present on the substrate surface prior to bonding. Various methods for reliably removing such contaminates from the substrate surface prior to bonding have their own problems, for example, solvents used to clean the surface may also remove the oil from the bearing or damage the seal for the bearing to greatly shorten the life of the bearing, or grit blasting and grinding performed on the wheel to remove the contaminate would, in a significant number of cases, damage the bearing.

(2) It very often happens that troubles develop with the bond between the tire and the rim either in manufacture or in usage, and, at present, it is usually required to throw away or sacrifice the costly roller, because it can be too expensive to cut off the old tire and prepare the substrate surface for further bonding of a new tire.

(3) While there are considerable advantages to using hysteresis or different property elastomeric tires, the duty to be paid where exporting an entire assembled roller may make it noncompetitive with a product produced in the receiving country, and the prior art bonding methods required such complete assembly of the roller and did not facilitate assembly of the tire produced in the United States on a roller produced in another country.

(4) The inventory of rollers to be carried for future assembly in specific rollerway conveyor or guide units can be quite expensive when taking into consideration complete roller assemblies with bonded tires having widely differing properties of hysteresis and elasticity for different ultimate environments.

(5) Load rating in the past has been limited by the tire capacity, not by the bearing capacity and standardized wheel subassemblies with bearings have a limited standardized outer surface for bonding of a tire in accordance with conventional techniques that thereby limit the load capacity of the assembly to far below the rating of the actual bearing.

(6) There is a compromise in metal qualities between those best suited for the purposes of providing an outer race and those properties best suited for supporting, or bonding, the tire or for other needs.

These problems as analyzed above are solved in accordance with a separate manufacture of the wheel subassembly to include inner race, antifriction roller elements, outer race and variations of these basic elements, to be thereafter force fit assembled with a tire subassembly when needed, which tire subassembly includes an elastomeric annular tire permanently bonded onto a rigid metal or high tensile modulus substrate, all of which solves the problems, respectively, as follows:

(1) The substrate of the tire subassembly, rim, preferably a metallic cylindrical tube, can be easily processed by solvents, grit blasting, or grinding, or the like independently and removed from the bearing to best prepare its outer surface for bonding with a resilient tire and, thereafter, the rim preferably immediately bonded to the resilient tire without intervening manufacturing steps related to some other portion of the roller, such as assembling of the bearing, that might contaminate the now clean surface. That is, the tire subassembly including the tire bonded on a rim can be completed independently and apart from the wheel subassembly that includes the bearing.

(2) If trouble develops with the bond or properties of the tire, the tire subassembly may be easily pushed off or disassembled from the wheel subassembly and a new tire subassembly assembled, with little loss of time or materials, in the use of unskilled labor without extensive special purpose tools.

(3) Tire subassemblies may be manufactured for specific applications and shipped overseas with minimum duty to be thereafter assembled on standardized wheel subassemblies competitively with products produced abroad.

(4) The inventory becomes less expensive and less in both quantity and weight since only a wide variety of tire subassemblies need be inventoried for use with a small inventory of common standardized wheel subassemblies, which is particularly important considering the high cost of the wheel subassemblies, particularly caused by the antifriction bearing.

(5) Standardized wheel subassemblies that include the bearing have a fixed width for their outer surface and can be used to mount tire subassemblies of greater width for specific applications to thereby increase the load carrying capacity of the tire, within the limits of the usually greater load carrying capacity of the bearing.

(6) The sleeve tube or rim of the tire subassembly may be constructed of a material specifically suited for its purpose without having to compromise for the needs of the wheel subassembly bearing. For example, it may be constructed of steel, plated steel, aluminum, brass, or even a synthetic resin or plastic material.

BRIEF DESCRIPTION OF THE DRAWING

Further advantages, objects and features of the present invention will be more clearly set forth with respect to a detailed description of a preferred embodiment shown in the accompanying drawing, wherein.

DETAILED DESCRIPTION OF A PREFERRED EMBODIMENT

In this application, including the claims, the term "interference fit" means that the unassembled rim has an internal diameter less than the external diameter of the outer race that it will engage when assembled when all other conditions are equal, such as equal temperature, and that as assembled the only securement between them will be the frictional forces of the peripherally engaging surfaces that are resiliently and radially pressed together by the inherent resiliency of the materials.

The assembly is by elastic deformation of the materials through such assembly processes as prestressing of either the inner or outer part, or both, by heat differential (for example a shrink fit), mechanical flexing, elastic joining or snap fit, or by a driven force fit. This frictional engagement alone will be sufficient to maintain the assembly unitary for the purposes of conveying without relative movement between the outer race and tire rim.

Figure 1:
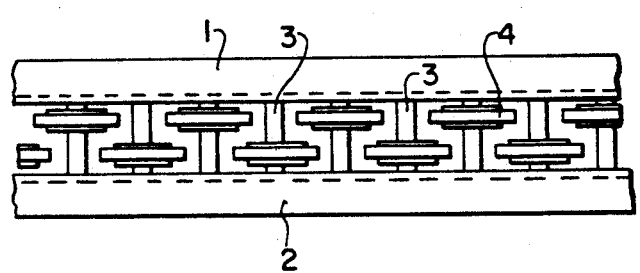
FIG. 1 is a top plan view of a rollerway conveyor, particularly a gravity rollerway conveyor of the present invention.
Figure 2:
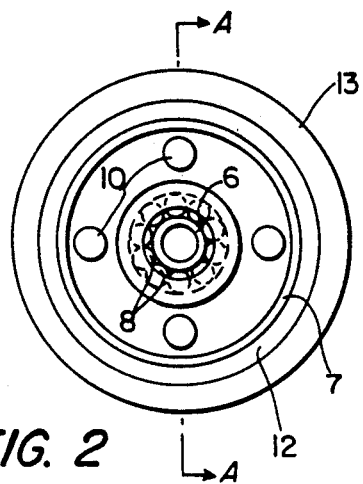
FIG. 2 is an enlarged side elevation view of one roller used in the conveyor shown in FIG. 1.

As shown in FIG. 1, the present invention is with respect to a conveyor roller more specifically a rollerway conveyor having a plurality of rollers mounted between parallel rails 1 and 2 on a corresponding plurality of parallel axles 3, with one roller 4 for each axle 3. Thereby, the rollers are mounted for rotation about parallel axes, which axes are in a common plane. The plane of the axes may be horizontal for a transfer table, vertical for a side supporting conveyor, or inclined in a conveying direction for an undriven gravity conveyor, for example. Thereby, the rollers form an outer support plane parallel to the plane of the axes, which support plane coincides with an outermost portion of each roller.

Figure 3:
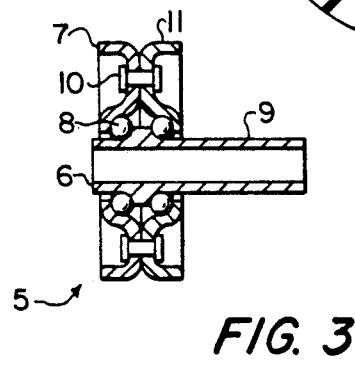
FIG. 3 is a cross-sectional view of the bearing subassembly taken along line A—A of FIG. 2.
Figure 4:
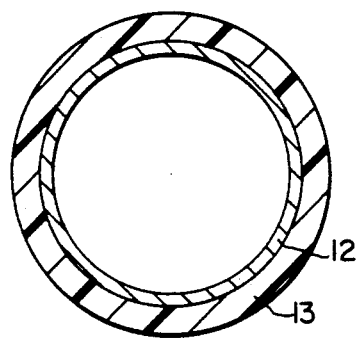
FIG. 4 is a cross-sectional view of the tire subassembly taken in a plane parallel to the plane of FIG. 2.

Each roller consists of a wheel subassembly, for example as shown in FIG. 3 and a tire subassembly, for example as shown in FIG. 4. In FIGS. 3 and 4, the subassemblies are shown separately.

The wheel subassembly as shown in FIG. 3 comprises three basic elements, an inner race 6, an outer race 7, and a plurality of antifriction roller elements 8 therebetween. Each of these elements may take on various forms in accordance with the present invention. The inner race 6 may include a shaft 9 that is in one piece with the inner race as shown or separate and drivingly secured thereby (not shown). The outer race may comprise a plurality of separate elements as shown or be constructed in one piece (not shown). The roller elements may be balls, as shown, or cylindrical rollers (not shown). For the specific embodiment shown, the outer race comprises formed sheet metal portions that are rigidly joined together by rivets 10. The inner race and outer race are formed with opposing annular bearing surfaces forming a raceway therebetween to accommodate the antifriction roller elements to form an antifriction bearing. This structure is more fully shown in the above-mentioned U.S. patent. The outer race includes an outer, generally cylindrical surface 11.

The tire subassembly includes a cylindrical rim 12 that has an inner cylindrical surface and an outer cylindrical surface. A cylindrical elastomeric tire 13 has an inner cylindrical surface bonded to the outer cylindrical surface of the rim 12. The bonding may be by means of self adhesion, vulcanizing, the application of adhesives, or the application of solvents. In any event, the tire 13 is permanently bonded to the outer surface of the rim 12 so as to prevent relative rotation between the two. The elastomeric tire 13 may have its hardness, elasticity, hysteresis properties, etc., chosen according to its purpose and the environment in which it is to be used and in accordance with the loads it is to support. A plurality of such tire subassemblies may be stockpiled with many different types being stockpiled in accordance with the above characteristics that may be desired.

As shown in FIGS. 3 and 4, the outer diameter of the surface 11 for the wheel subassembly is greater than the inner diameter of the tire subassembly when the subassemblies are separate from each other and under the same environmental conditions, for example, at the same temperature. The wheel subassemblies are kept in inventory as common to all tire subassemblies, that is all wheel subassemblies will be identical to each other and common to a plurality of different types of tire subassemblies. Also, it is possible to provide a plurality of different wheel subassemblies, for example, that differ in bearing load capabilities or shaft configuration, which, in turn, may be interchangeable with a plurality of different types of the tire subassemblies. The critical feature is that all of the tire subassemblies have substantially the same inner diameter, that all of the wheel subassemblies have substantially the same outer diameter, and that the outer diameter of the wheel subassemblies be larger than the inner diameter of the tire subassemblies, so as to provide for an interference fit as defined above. Interference fit is the most economic and convenient method, but cementing can also be used, in which case the inner diameter of the tire subassembly is larger than the outer diameter of the wheel subassembly.

The assembly process may be by cooling the wheel subassembly and/or heating the tire subassembly prior to assembly, so that after assembly the two subassemblies may reach the same temperature and provide for the interference fit. Also, a suitable press may be used for the assembly for a force fit. In any event, the only means holding the tire subassembly on the wheel subassembly is the frictional engagement between the roller subassembly outer surface 11 and the inner surface subassemblies that will cause radial forces that are perpendicular to the engaging surfaces, that is the tire subassembly will be in tension and the wheel subassembly will be in compression as a result of the interference fit when assembled.

Figure 5:
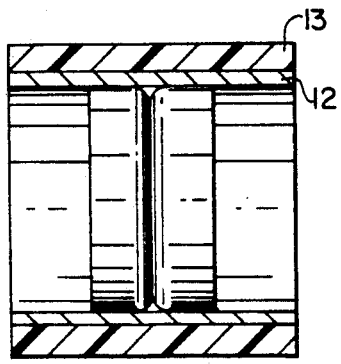
FIG. 5 is a partial cross-sectional view of the roller, taken along line A—A of FIG. 2.

In general, the limiting factor for a load carrying capacity in the past has been the load carrying capacity of the elastomeric tire and the anti-friction bearing has had a load carrying capacity many times greater. With the present invention, when it is desired to have a high load capacity roller, a tire subassembly may be selected of a far greater width axially measured than the roller subassembly, so that the load carrying capacity of the elastomeric tire may then be greater or even approximately equal the load carrying capacity of the bearing, for example, as shown in FIG. 5. This is in contrast to the usual construction wherein the width of the tire subassembly (not shown) is equal to or less than the width of the roller subassembly of FIG. 3.

Figure 6:
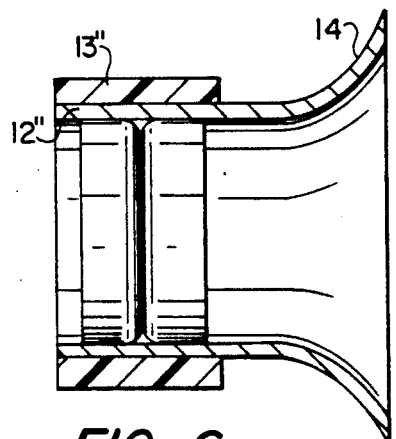
FIG. 6 is a view similar to FIG. 5, but including a different tire subassembly.

A further modification is contemplated in accordance with FIG. 6, wherein the rim 12" may be extended outwardly in one axial direction and then flared or bent radially outwardly to provide a guide portion 14 that extends radially outwardly beyond the elastomeric tire 13" and axially spaced therefrom. With such a construction, a support surface of horizontal axis rollers could support articles and engage the sides of the articles with the flared portions 14 to maintain the articles on the rollers. Two flights of such rollers could be provided for supporting pallets, for example, and each flight could have a plurality of its rollers constructed in accordance with FIG. 6, with the flared portions respectively towards the outside to prevent the pallets from moving laterally with respect to the conveyor that is moving in an axial direction with respect to the roller axes. Thereby, it is seen that the present invention affords the possibility of providing a wide variety of tire subassemblies with differing characteristics and functions that may be quickly and easily assembled on common standardized roller subassemblies without the disadvantages mentioned above.

Figure 7:
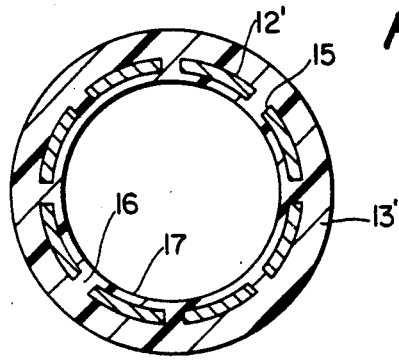
FIG. 7 is a cross-sectional view of a modified tire subassembly taken in a plane parallel to the plane of FIG. 2.

Another modification of the tire subassembly is shown in FIG. 7. The rim 12' is constructed of a permeable material, such as wire mesh, which may be woven or braided or felted (non-woven) fabric in a tubular form. This porous design allows the elastomer to penetrate the fabric and form an improved bond. It is possible to thus construct the tire subassembly by cutting off axial lengths of desired length (width of the tire subassembly) from a molded tube. Specifically shown is a thin metal rim 12' substantially identical to the metal rim 12 of FIG. 4, but with a plurality of holes or apertures 15 extending through it in the radial direction. Thus, when the elastomer is molded to form the tire 13', portions of the elastomer 16 extend through the holes 15. Preferably, the elastomer extends through the holes 15 to enter into the interior of the rim 12' against a molding mandrel to form a thin layer or portions 17 of elastomeric material with a cylindrical inner surface. This layer or the portions 17 of elastomeric material inside of the rim will provide a better bond for the tire and rim, but more importantly, will also compensate for variations in diameters of the wheel subassembly and variations of the diameter of rim interior surface, to form an improved press or interference fit.

A preferred embodiment has been set forth for purposes of illustrating broader concepts of the present invention as well as specifically illustrating narrow advantageous structural features, and further embodiments, variations, and modifications are contemplated, all in accordance with the spirit and scope of the following claims.

What is claimed is:

1. A rollerway conveyor, comprising:
    a support;
    a plurality of substantially identical rollers mounted on said support with generally parallel axes of rotation, lying in a common plane, and aligned with respect to the conveying direction that is perpendicular to the roller axes;
    each of said rollers having an outer annular elastomeric tire at least partly extending radially outwardly beyond the remainder of the roller to provide the load engaging surface for the conveyor, with each of said annular tires having an outer peripheral surface and an inner peripheral cylindrical surface;
    each of said rollers having a generally tubular rigid cylindrical rim constructed of a material having a plurality of holes extending radially therethrough for supportingly engaging and being permanently bonded concentrically within said annular tire to said inner peripheral surface, wherein the elastomeric material of said annular tire extends through said holes to improve the bond between the rim and the annular tire;
    each bonded tire and rim being a replaceable tire subassembly;
    each of said rollers including a wheel subassembly comprising an outer peripheral cylindrical surface of a normal diameter greater than the normal interior diameter of the inner cylindrical surface of said replaceable tire subassembly when separate and apart from said wheel subassembly and under the same environmental conditions for purposes of reference;
    said conveyor having each of said replaceable tire subassemblies concentrically mounted directly on a corresponding wheel subassembly with a force fit engagement extending directly between the inner cylindrical surface of the tire subassembly and the outer cylindrical surface of the wheel subassembly and with the replaceable tire subassembly inner cylindrical surface frictionally engaging the outer cylindrical surface of the wheels subassembly and thereby providing the sole means supporting the replaceable tire subassembly on said wheel subassembly and preventing relative rotation therebetween; and
    the difference in normal diameters providing means for elastic deformation of said subassembly so that said replaceable tire assembly is under tension and said wheel subassembly is under compression to provide an interference fit therebetween.

2. A rollerway conveyor according to claim 1, wherein the material of said rim is wire or fiber mesh.

3. A rollerway conveyor according to claim 1, wherein said elastomeric material extends inwardly beyond said rim to form an interior thin layer of elastomeric material between said rim and wheel subassembly when assembled.

4. A conveyor roller, comprising:
    an outer annular elastomeric tire at least partly extending radially outwardly beyond the remainder of the roller to provide the load engaging surface for the conveyor, with said tire having an outer peripheral surface and an inner peripheral cylindrical surface;
    said roller having a generally tubular, rigid cylindrical rim constructed of a material having a plurality of holes extending radially therethrough for supportingly engaging and being permanently bonded concentrically within said annular tire to said inner peripheral surface, wherein the elastomeric material of said annular tire extends through said holes to improve the bond between the rim and said annular tire;
    said bonded tire and rim being a replaceable tire subassembly;
    said roller including a wheel subassembly comprising an outer peripheral cylindrical surface of a normal diameter greater than the normal internal diameter of the inner cylindrical surface of said replaceable tire subassembly when said replaceable tire subassembly is separate and apart from said wheel subassembly and under the same environmental conditions for purposes of reference;
    said replaceable tire subassembly being concentrically mounted directly on the wheel subassembly with a force fit engagement extending directly between the inner cylindrical surface of the tire subassembly and the outer cylindrical surface of the wheel subassembly and with the replaceable tire subassembly inner cylindrical surface frictionally engaging the outer cylindrical surface of the wheel subassembly and thereby providing the sole means supporting the replaceable tire subassembly on said wheel subassembly and preventing relative rotation therebetween; and said difference in normal diameters providing means for elastic deformation of said subassemblies so that said replaceable tire subassembly is under tension and said wheel subassembly is under compression to provide an interference fit therebetween.

5. A conveyor roller according to claim 4, wherein the material of said rim is wire or fiber mesh.

6. A conveyor roller according to claim 4, wherein said elastomeric material extends inwardly beyond said rim to form an interior thin layer of elastomeric material between said rim and wheel subassembly when assembled.

7. A set of conveyor rollers, comprising:

a first set of a plurality of identical replaceable tire subassemblies, a first set of a plurality of identical replaceable wheel subassemblies, and at least a second set of one of said tire and wheel subassemblies that are identical with themselves and differ from the corresponding first set of subassemblies in structure that produces a different conveyor roller characteristic than the corresponding first set;

each of said replaceable tire subassemblies having an outer annular elastomeric tire at least partly extending radially outwardly beyond the remainder of the tire subassembly to provide the load engaging surface for the conveyor, with each of said inner annular tires having an outer peripheral surface and an inner peripheral cylindrical surface;

each of said replaceable tire subassemblies further having a generally tubular, rigid, cylindrical rim constructed of a material having a plurality of holes extending radially therethrough for supportingly engaging and being permanently bonded concentrically within said annular tire to said inner peripheral surface, wherein the elastomeric material of said annular tire extends through said holes to improve the bond between the rim and the annular tire;

each of said replaceable wheel subassemblies comprising an outer peripheral cylindrical surface of a common identical normal diameter that is greater than a common cylindrical normal inner diameter of the inner cylindrical surface of said replaceable tire subassemblies when said replaceable tire subassemblies are separate and apart from said wheel subassemblies and under the same environmental conditions for purposes of reference;

said common cylindrical outer diameters for said replaceable wheel subassemblies, said common cylindrical inner diameters for said replaceable tire subassemblies and said difference in normal diameters between said replaceable wheel subassemblies and said replaceable tire subassemblies together being means providing concentric mounting selectivity of any one of said corresponding first and second tire subassemblies on any one of said corresponding first and second wheel subassemblies with a force fit engagement extending directly between the inner cylindrical surface of the corresponding one of said first and second tire subassemblies and the outer cylindrical surface of the corresponding one of said first and second wheel subassemblies and with the rim inner cylindrical surface frictionally engaging the outer cylindrical surface of the replaceable wheel subassembly and thereby providing the sole means supporting the replaceable tire subassembly on said replaceable wheel subassembly and preventing relative rotation therebetween; and said difference in normal diameters providing means for elastic deformation of said mounted subassembly so that each of said replaceable tire subassemblies would be under tension and each of said replaceable wheel subassemblies would be under compression to provide an interference fit therebetween when mounted.

8. A set of conveyor rollers according to claim 7, wherein the material of said rim is wire or fiber mesh.

9. A set of conveyor rollers according to claim 7, wherein said elastomeric material extends inwardly beyond said rim to form an interior thin layer of elastomeric material between said rim and wheel subassembly when assembled.

* * * * *